(12) United States Patent
Keenan et al.

(10) Patent No.: US 9,727,035 B2
(45) Date of Patent: Aug. 8, 2017

(54) COMPUTER APPARATUS AND METHOD USING MODEL STRUCTURE INFORMATION OF MODEL PREDICTIVE CONTROL

(71) Applicant: Aspen Technology, Inc., Houston, TX (US)

(72) Inventors: Michael R. Keenan, Sugar Land, TX (US); Hong Zhao, Sugar Land, TX (US); Magiel J. Harmse, Houston, TX (US); Lucas L. G. Reis, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 720 days.

(21) Appl. No.: 14/268,623

(22) Filed: May 2, 2014

(65) Prior Publication Data

US 2014/0330402 A1 Nov. 6, 2014

Related U.S. Application Data

(60) Provisional application No. 61/818,892, filed on May 2, 2013.

(51) Int. Cl.
*G05B 13/02* (2006.01)
*G05B 13/04* (2006.01)
(52) U.S. Cl.
CPC .................... *G05B 13/04* (2013.01)
(58) Field of Classification Search
CPC .................................................. G05B 13/04
(Continued)

(56) References Cited

U.S. PATENT DOCUMENTS 6,947,876 B1 9/2005 Galarza et al.
7,209,793 B2 4/2007 Harmse et al.
(Continued)

OTHER PUBLICATIONS

Hong Zhao, J. Guiver and G. Sentoni, "An identification approach to nonlinear state space model for industrial multivariable model predictive control," Proceedings of the 1998 American Control Conference. ACC (IEEE Cat. No. 98CH36207), Philadelphia, PA, 1998, pp. 796-800 vol. 2., doi: 10.1109/ACC.1998.703517.*
(Continued)

*Primary Examiner* — James D Rutten
(74) *Attorney, Agent, or Firm* — Hamilton, Brook, Smith & Reynolds, P.C.

(57) ABSTRACT

A system and method of model predictive control executes a model predictive control (MPC) controller of a subject dynamic process (e.g., processing plant) in a configuration mode, identification mode and model adaptation mode. Users input and specify model structure information in the configuration mode, including constraints. Using the specified model structure information in the identification mode, the MPC controller generates linear dynamic models of the subject process. The generated linear dynamic models collectively form a working master model. In model adaptation mode, the MPC controller uses the specified model structure information in a manner that forces control actions based on the formed working master model to closely match real-world behavior of the subject dynamic process. The MPC controller coordinates execution in identification mode and in model adaptation mode to provide adaptive modeling and preserve structural information of the model during a model update.

26 Claims, 7 Drawing Sheets

(58) Field of Classification Search
USPC .................................................... 700/31
See application file for complete search history.

(56) References Cited

U.S. PATENT DOCUMENTS

| | | | |
|---|---|---|---|
| 7,231,264 B2 | 6/2007 | Zheng et al. | |
| 7,797,063 B2 | 9/2010 | Hall et al. | |
| 8,560,092 B2 | 10/2013 | Zheng et al. | |
| 2005/0055110 A1* | 3/2005 | Tuszynski | G05B 17/02 |
| | | | 700/31 |
| 2006/0111858 A1 | 5/2006 | Zhu | |
| 2007/0050053 A1* | 3/2007 | Cutler | G05B 11/32 |
| | | | 700/34 |
| 2007/0225835 A1 | 9/2007 | Zhu | |
| 2008/0052050 A1* | 2/2008 | Hall | G05B 13/042 |
| | | | 703/2 |
| 2008/0077257 A1* | 3/2008 | Peterson | G05B 13/048 |
| | | | 700/34 |
| 2011/0130850 A1* | 6/2011 | Zheng | G05B 13/048 |
| | | | 700/31 |
| 2013/0204403 A1 | 8/2013 | Zheng et al. | |
| 2013/0246316 A1 | 9/2013 | Zhao et al. | |

OTHER PUBLICATIONS

S.Joe Qin, Thomas A. Badgwell, A survey of industrial model predictive control technology, Control Engineering Practice, vol. 11, Issue 7, Jul. 2003, pp. 733-764, ISSN 0967-0661, http://dx.doi.org/10.1016/S0967-0661(02)00186-7.*

Hong Zhao, Michael Harmse, John Guiver, William M. Canney, Subspace Identification in Industrial APC Applications—A Review of Recent Progress and Industrial Experience, IFAC Proceedings Volumes, vol. 39, Issue 1, 2006, pp. 1074-1079, ISSN 1474-6670, http://dx.doi.org/10.3182/20060329-3-AU-2901.00172.*

B. Joseph, "A tutorial on inferential control and its applications," Proceedings of the 1999 American Control Conference (Cat. No. 99CH36251), San Diego, CA, 1999, pp. 3106-3118 vol. 5.*

* cited by examiner

COMPUTER APPARATUS AND METHOD USING MODEL STRUCTURE INFORMATION OF MODEL PREDICTIVE CONTROL

RELATED APPLICATIONS

This application claims the benefit of U.S. Provisional Application No. 61/818,892, filed on May 2, 2013. The entire teachings of the above application is incorporated herein by reference.

BACKGROUND OF THE INVENTION

Model Predictive Control (MPC) is the most widely used advanced process control technology applied in process industries. There are more than 10,000 worldwide applications currently in service. A MPC controller relies on a model to predict the behavior of a process (the controlled variables, CV) and makes changes to the manipulated variables (MV) so that it can keep the process running inside a prescribed constraint set. An excellent model is a prerequisite to a successful implementation of MPC. Successful models generally have two common characteristics.

First, the predictions from the model must closely match the observed real world behavior of the process. This places a minimum accuracy requirement on the so-called "forward model." The model dynamics must be sufficiently accurate to predict towards a steady state even during a large dynamic transient, and the steady state gains needs to be sufficiently accurate to predict where the process will line out, since the control target optimization (e.g. Linear Program, or LP) calculation will be initialized at the predicted steady state value expected to be achieved several hours into the future.

Second, the behavior of the Linear Program is dependent on the accuracy of the inverse gain matrix, the so-called "reverse model." Small errors in the gain matrix can lead to large errors in the inverse gain matrix under adverse worst case conditions, and the MVs can easily move in the wrong direction and cause poor control performance as well as system instability under these conditions. Ideally, the control actions based on the model must also be understood by the users of the MPC and must match their engineering judgment. This means that the predictions from the model inverse must closely match the observed real world behavior.

The importance of the first point is well-known to users of MPC controllers. Long periods of step-testing the process by manipulating process inputs is often required. It is necessary to sift through historical data and carefully discard data contaminated by unmeasured disturbances. The importance of the second point has also recently been viewed by many users as vital to the success of MPC applications and MPC controllers. When the initial model is created and when model updates are performed during subsequent maintenance work, it is vital that the engineering judgments about proper control action be imposed on the model, i.e. MVs need to move in the correct direction and by approximately the correct amount.

SUMMARY OF THE INVENTION

The present invention provides a solution for implementing engineering judgment to increase robustness of an MPC controller. "Engineering judgment" includes an understanding of control actions based on the model. In particular, "engineering judgment" is an understanding of the physical and mathematical limits and relations in behavior of the subject process, such limits and relations (and this "engineering judgment") are represented by constraints. Specifically, the present invention is directed to a new computer apparatus and method to update (or create) a model used in MPC control so that engineering judgment about the inverse gain matrix is preserved, i.e., steady-state values need to move in the correct direction and by approximately the right amount.

Accordingly, the present invention is directed to a method, apparatus, or computer program product for off-line and on-line identifying and updating a multiple-input-multiple-output (MIMO) dynamic model of model predictive control (MPC) of a subject dynamic process by a MPC controller. The MPC controller represents the subject dynamic process by a master model. The method, apparatus, or computer program product comprise receiving a set of model structure information as input by a user, the set of model structure information comprising a plurality of constraints representative of engineering judgment. The method, apparatus, or computer program product further receives a set of process data from each cycle of the subject dynamic process; creates a set of cases from the master model, the cases comprising information about the subject dynamic process, and each case being a portion of the master model. The method, apparatus, or computer program product then specifies user-selected constraints from the model structure information and the master model; and from one or more cases of the set of cases, creates a plurality of linear dynamic models of the process using the set of user-selected constraints, the set of process data, and a model identification calculation. Collinearity is then repaired in the updated master model using at least one of: gain uncertainty or RGA uncertainty; and then the method, apparatus or computer program product implements (or deploys) the updated master model to the MPC controller, wherein implementing the updated master model preserves the plurality of constraints representative of engineering judgment.

In another embodiment, the plurality of constraints comprises at least one of: simple steady state gain constraints; steady state gain ratio constraints; material balance constraints; gain uncertainty; RGA uncertainty; or locked gains.

In another embodiment, the model identification calculation for each case is a subspace identification algorithm to find a solution that satisfies the plurality of constraints and calculate an optimal model using the user-selected constraints and the set of process data.

In another embodiment, the subspace identification algorithm comprises the steps of transferring at least one gain constraint into a constrained vector estimation problem; identifying an unconstrained state space model; identifying an optimal model order to obtain an optimal state variable estimate; calculating a solution to the constrained vector estimation problem using the unconstrained state space model.

In another embodiment, creating an updated master model comprises finding a solution to a coordinated identification calculation that satisfies the plurality of constraints and calculates an optimum master model.

In another embodiment, the coordinated identification calculation comprises the steps of: passing at least one simple gain constraint from the master model to at least one case from the set of cases; passing at least one gain ration constraint to at least one case from the set of cases, converting the gain ratios constraint to simple gain constraints if necessary; passing at least one general gain constraint to at least one case from the set of cases, converting the general gain constraints to simple gain constraints if necessary; identifying a set of subcase models using a constrained identification calculation and the set of process data; updating the master model by assembling the set of subcase models.

In another embodiment the master model undergoes collinearity repair due to at least one RGA violation or general gain constraint violation existing within the master model.

In another embodiment, the collinearity repair comprises the steps of: identifying a set of submodels from the master model; sorting the set of submodels into a list; solving the set of submodels in order as defined by the list; calculating an objective function over the set of submodels; reordering the set of submodels and repeating the steps until substantially all RGA violations or general gain constraint violations are repaired.

In another embodiment, each set of submodels is represented by a 2×2 matrix.

In another embodiment, the step of repairing collinearity in the updated master model further comprises the steps of: identifying a set of submodels from the master model; receiving a set of user-defined RGA constraints; converting RGA constraints into gain ratio constraints; transferring gain ratios from the master model to the set of submodels; solving the set of submodels so that substantially all submodels satisfy the user-defined RGA constraint.

In another embodiment, implementing the updated master model to the MPC controller ensures that the updated master model accurately predicts towards a steady state gain matrix and ensures accuracy of corresponding inverse gain matrix.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In order to describe the methods and articles of this invention in detail, an exemplar system will first be defined. It will be apparent to those of skill in the art that these definitions are for illustrative purposes only and that this invention includes additional methods not illustrated herein. It will also be apparent to those of skill in the art that this invention is applicable to systems and models that are not illustrated and/or do not comport with the definitions listed herein.

Figure 1:
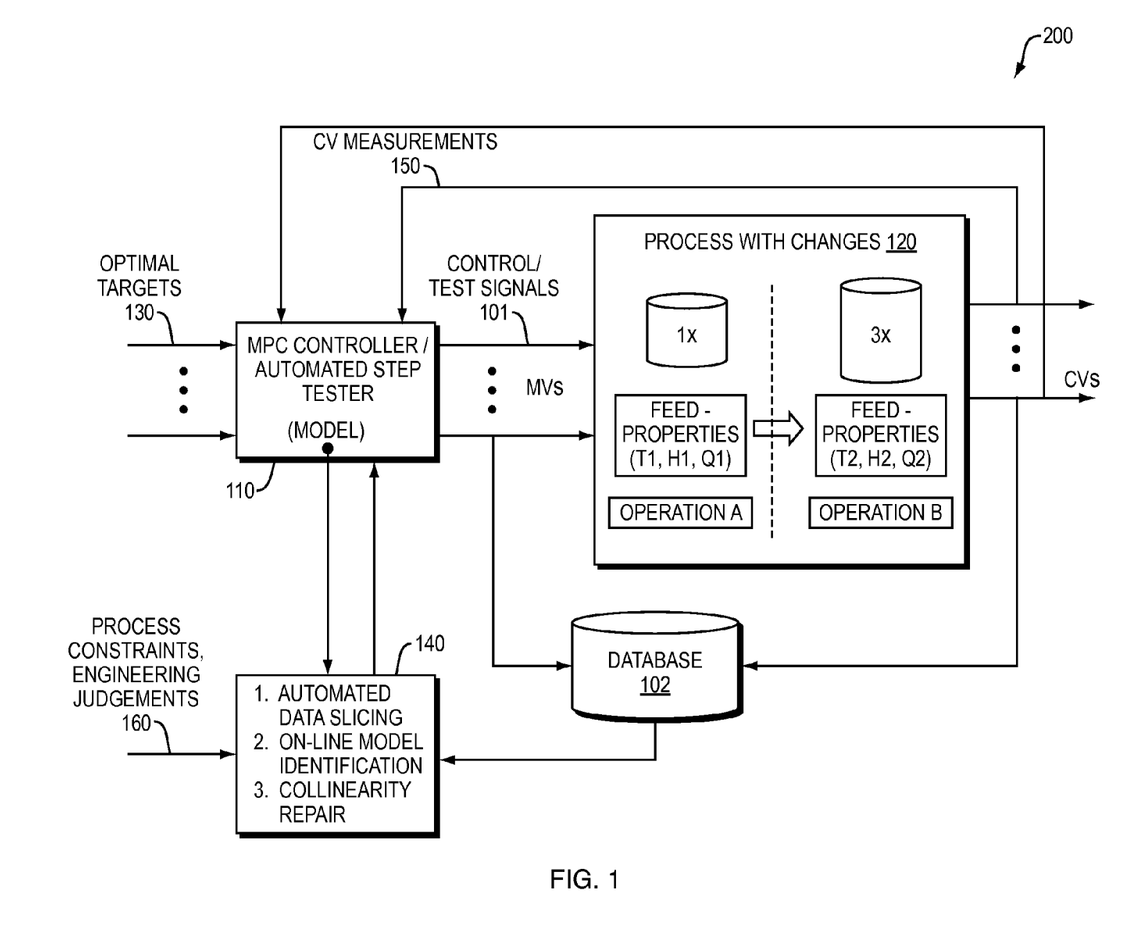
FIG. 1 is a block diagram of a MPC control system embodying the present invention.

FIG. 1 is a block diagram of a MPC control system 200 embodying the present invention. An MPC controller 110 controls a subject dynamical process 120 (such as that of a processing plant) based on optimal targets 130. The controller 110 includes an automated tester to perturb the process 120 in an embodiment. While FIG. 1 shows the controller and the tester together as 110, it should be understood by one of ordinary skill in the art that in another embodiment, a separate controller and tester may be provided. The controller 110 sends control/test signals 101 that set the values of manipulated variables (MVs) of the subject process 120. The MVs are independent variables in the sense that they can be set as desired to perturb the process and to control the controlled variables (CVs) within their constraints set and operation limits. Measurements of control variables (CVs) 150 resulting after perturbation are fed back to the controller 110. Control variables are so named because they are controlled through the manipulated variables; thus, the CVs are dependent variables that depend on the MVs. A real-time database 102 is used to store historical data regarding the MVs and the corresponding CVs. Although multiple optimal targets 130, MVs, and CVs 150 are shown in FIG. 1, it should be understood that there may be a single optimal target, MV, and/or CV.

An automated data selection and online model identification module 140 selects only the valid and informative data series in segments, and identifies a whole or a subset of the multi-input multi-output (MIMO) model of controller 110 based on selected inputs and outputs data from the process 120 and the database 102. The model identification module 140 may also receive inputs regarding process constraints and engineering judgment 160. The module 140 may be part of performance diagnostics which diagnose performance of the controller model as described in U.S. Pat. No. 8,560,092 and Patent Application Publication No. 2013/0246316, herein incorporated by reference in their entirety. In turn, module 140 updates (adapts) the model to improve performance. In total, the module 140 is capable of automated data slicing, on-line model identification, and collinearity repair.

There are several previous citations that focus on the sub-problem of the online updating of the process (controller) model. The teachings of these citations are herein incorporated by reference in their entirety and include:

Magiel J. Harmse and Qingsheng Zheng, "Automated closed loop step testing of process units," U.S. Pat. No. 7,209,793, Apr. 24, 2004.

Galarza et al., "Method for automated system identification", U.S. Pat. No. 6,947,876 B1, Sep. 20, 2005.

Yucai Zhu, "Computer method and apparatus for online process identification", Patent Application Publication No. US 2006/0111858 A1, May 25, 2006

Yucai Zhu, "Computer method and apparatus for adaptive model predictive control", Patent Application Publication No. US 2007/0225835 A1, Sep. 27, 2007.

Qingsheng Zheng and Hong Zhao, "Apparatus and Method for Model Quality Estimation and Model Adaptation in Multivariable Process Control," Patent Application Publication No. US 2011/0130850 A1, now U.S. Pat. No. 8,560,092

Hong Zhao and Magiel J. Harmse, "Apparatus and Method for Automated Data Selection in Model Identification and Adaptation in Multivariable Process control", Patent Application Publication No. 2013/0246316.

There are also several previous references that focus on the sub-problem of the use of engineering judgment to repair the model and make it usable for online control. These include:

Magiel J. Harmse and Qingsheng Zheng, "Methods and articles for detecting, verifying, and repairing collinearity," U.S. Pat. No. 7,231,264 B2, Jun. 12, 2007.

Hall et al., "Method for model gain matrix modification," U.S. Pat. No. 7,797,063 B2, Sep. 14, 2010.

Collinearity repair is a procedure for making sure that small changes in the outputs (such as a composition in the overhead of a distillation column) do not require large changes in the inputs (such as the reflux rate). This can either be done offline as in FIG. 1 or online such as in U.S. Pat. No. 7,209,793; U.S. Publication No. 2011/0130850, now U.S. Pat. No. 8,560,092; and U.S. application Ser. No. 13/760,949 filed February 2013 (all by Assignee and each herein incorporated by reference in its entirety). Performing the repair offline is usually the preferable option because the user has much more control over the repair offline. The online repair acts as a bootstrapping and last line of defense.

Definitions for an Example Embodiment

In an example system 200 embodying the present invention, the system 200 and/or MPC controller 110 has the following modes of operation: Configuration Mode; Identification Mode; Model Adaptation Mode.

In Configuration Mode, the user specifies the model structure information that will be used during the model identification and subsequent model adaptation modes. This information includes but is not limited to the following:

a. Simple steady state gain constraints: such as that the relationship between a certain input and output must have a specified steady state relationship which is typically, but not always, 0 or 1 or −1.

b. Steady state gain ratio constraints: such that the ratio of one steady state gain divided by another must have a certain value or a software-optimized value based on experimental data.

c. Material balance constraints: such that the linear combination of certain steady state relationships must equal a user-specified value (e.g. sum of inflows=sum of outflows).

d. Gain uncertainty: the model update algorithm will consider the gain uncertainty when calculating a model that has desirable closed-loop properties, such as a low Relative Gain Array (RGA) metric.

e. RGA uncertainty: the model update algorithm will consider the RGA uncertainty range when calculating a model that has desirable closed-loop properties.

f. Locked gains: certain steady state gains may be locked by the user during the model update (e.g. for pass flow deltas).

g. A list of cases of model identification: each case consists of a subset of the model utilized by the MPC controller 110.

In Identification Mode, the controller apparatus 110 uses the model structure information and process data together to identify linear dynamic models of the process 120. A new identification algorithm of the present invention (detailed later) is used to satisfy various gain constraints while allowing the model to fit the test data in an optimal way. Additionally, many separate cases are configured, each fitting a small sub-model so that together the collective sub-models constitute the final combined, "master model matrix." The system 200 coordinates the identification of these cases so that the structure information is used in a consistent manner across the submodels.

In Model Adaptation Mode, the controller apparatus 100 uses the model structure information to force the resulting submodels (which collectively make up the master model) of the Identification Mode to be consistent with engineering knowledge of the process 120 for an online application. The Identification Mode processing and Model Adaptation Mode processing work together. The Identification Mode processing is focused on ensuring that the predictions from the model will closely match the behaviors of the process 120. The Model Adaptation Mode processing is focused on ensuring that the control actions from the model will match the engineering expectations of the user In this way, embodiments of the present invention update a MPC model (that models process 120) in a manner that preserves engineering judgment about the inverse gain matrix (the reverse model of the master model matrix resulting from the Identification Mode).

The controller model is single "master model" that refers to the dynamic model for a MPC controller assembled from variety of sources. Consistency between the master model and sub-models means that any constraints and specifications on the master model are also satisfied by the sub-models. Moreover, when the sub-models are assembled back into a master model, the constraints and specifications that were defined at the model level are still satisfied.

In MPC controller 110, the gain matrix constraints that control a subject multi-input multi-output (MIMO) dynamic process 120 can be represented as follows: a model gain matrix (G) which relates the manipulated variables (MV) to controlled variables (CV) is represented by the equation CV=G*MV. The model gain matrix can also be described according to Equation 1:

$$\begin{bmatrix} CV_1 \\ CV_2 \\ \vdots \\ CV_p \end{bmatrix} = \begin{bmatrix} g_{11} & g_{12} & \cdots & g_{1r} \\ g_{21} & g_{22} & \cdots & g_{2r} \\ \vdots & \vdots & \ddots & \vdots \\ g_{p1} & g_{p2} & \cdots & g_{pr} \end{bmatrix} \times \begin{bmatrix} MV_1 \\ MV_2 \\ \vdots \\ MV_r \end{bmatrix} \quad \text{Equation 1}$$

where r and p is the number of inputs and outputs respectively, G can be, for example, the steady-state gain matrix or the frequency domain transfer functions that represent the subject process 120. The process model gain matrix G should satisfy certain constraints based on engineering knowledge and specific experiments.

For example, specified gain values can be represented as follows:

$$g_{ij} = \alpha_k (i=1, \ldots p; j=1, \ldots r; k=1, \ldots K_{const}) \quad \text{Equation 2}$$

where i is the $i^{th}$ output, j is the $j^{th}$ input, $K_{const}$ is the total number of scalar gain constraints.

Additionally, specified gain ratios can be represented by:

$$\frac{g_{ij}}{g_{kj}} = \frac{g_{ij}}{g_{nj}} = \ldots = \beta_l \quad \text{Equation 3}$$

$$(i = 1, \ldots p; j = 1, \ldots r; l = 1, \ldots L_{const})$$

where i is the $i^{th}$ output, j is the $j^{th}$ input, $L_{const}$ is the total number of gain ratio constraints.

The specified general gain relations can be represented by:

$$\alpha_{k1}g_{i_1j_1}+\alpha_{k2}g_{i_2j_2}+\ldots=\beta_k(i_1,i_2=1,\ldots p;$$
$$j_1,j_2=1,\ldots r; k=1,\ldots K_{const})$$

Equation 4 where $i_1, i_2$ are the $i_1$th output and $i_2$th output, $j_1, j_2$ are the $j_1$th and $j_2$th input, $K_{const}$ is the total number of gain ratio constraints.

The master model refers to the dynamic model for a MPC controller 110 assembled from sources such as, for example: (1) user specification such as first order models with time constant directly specified by the user; and (2) model identification cases. Model identification cases only consider subsets of the inputs and outputs of the overall model. The user must then assemble the overall model from the separate sources. The overall model is otherwise known as the "master model." Assembling the master model in this fashion can result in steady-state gains that create collinearity issues and other inconsistencies. Accordingly, the present invention is directed to algorithms (methods and processes) which allow the user to specify gain constraints at both the master model level and the individual case level. The system 200 is configured to then enforce a consistent set of specifications.

Figure 2:
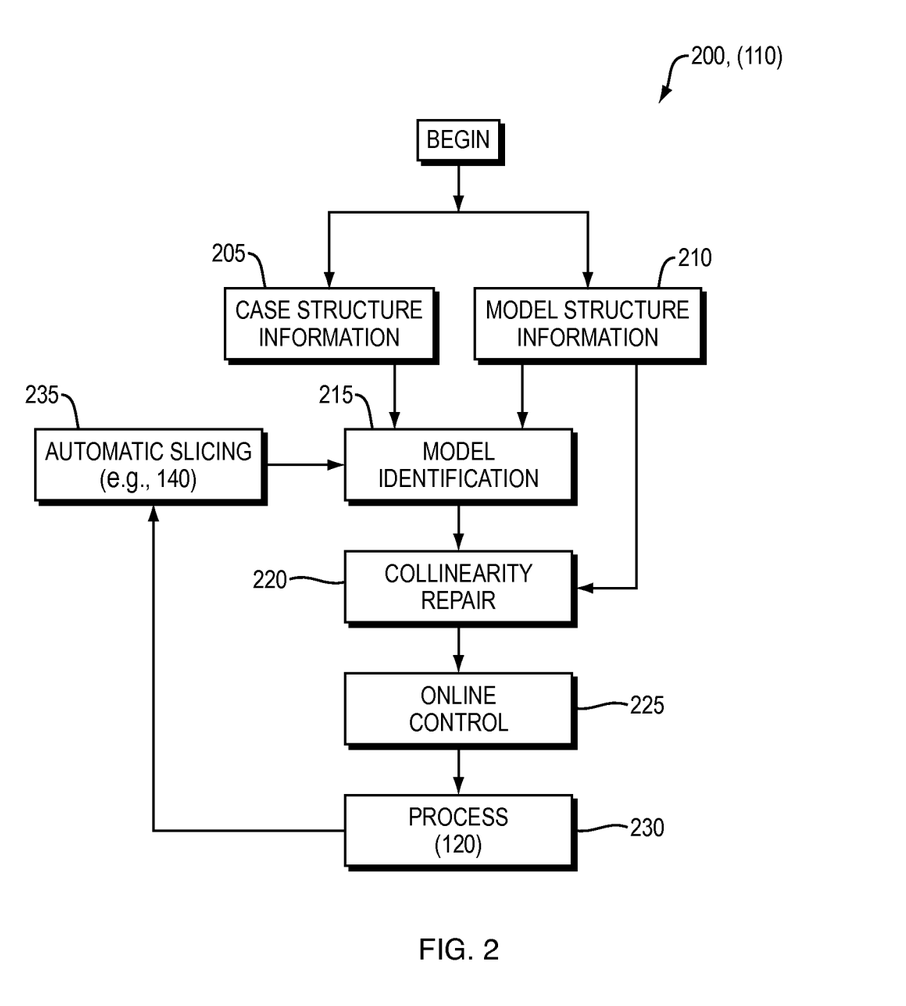
FIG. 2 is a flow diagram of the operations of the MPC controller of the embodiment of FIG. 1.

FIG. 2 is a flow diagram of the operation of MPC control system 200 that maintains engineering judgment in model updates (and method for achieving the same according to the principles of the present invention). The operations or steps do not need to occur in the order presented, and one skilled in the art would recognize substitute steps or alternative step organization that would still be within the goals of the present invention.

The system 200 is user interactive and begins by receiving case structure information 205 provided to the MPC controller 110 by a user. The case structure information 205 represents subsets of information about process structure that the controller 110 will use to create the model of the subject process 120. The case structure information lists the process variables, specifically the controlled variables (CV) and the manipulated variables (MV), as well as the time to steady-state identification parameters, transform information, and variable filtering.

Similarly, system 200 receives model structure information 210 provided by a user. The model structure information is used in model identification 215 and model adaptation (collinearity repair 220) described below. The model structure information 210 can be any type of gain constraints used to satisfy engineering judgment. This can include special gain value, gain ratio, or gain balance (described in Equations 2-4 (above) and 5 (below)). These constraints are transferred into a general gain constrained model identification problem, which is described in more detail below.

A subspace identification algorithm is then applied to solve the problem with process testing/historical data. The algorithm can apply to both the master model and subset model identification problems. In a complex MPC application, iterative and coordinate approaches can be used.

For example, consider a mix set of gain matrix constraints described in Equations 2-4 which have been specified by a user. Every constraint on the gain matrix can be expressed in the following vector—from general linear equations:

$$S_{(L \times pr)} \times \text{Vec}(G) = g_0$$

Equation 5 where S is a (L×pr) matrix called a "selection matrix" and subscripts L, p, r are the number of constraints, outputs and inputs respectively; G is the gain matrix; operator Vec(•) is a transform to convert the matrix into a column-wise stacked vector; and $g_0$ is a scalar vector.

Further, if the following constraints are specified:
(1) One special gain values as $g_{21}=a$;
(2) Two gain ratio $g_{11}/g_{31}=g_{21}/g_{41}=2$;
(3) One mass-balance constraint as $g_{11}+g_{21}-3g_{31}=0$;

Then, the following equation with selection matrix and $g_0$ vector will cover all three constraints:

$$\begin{bmatrix} 0 & 1 & \ldots & 0 & \ldots & 0 \\ 1 & 0 & -2 & 0 & \ldots & 0 \\ 0 & 1 & 0 & -2 & \ldots & 0 \\ 1 & 1 & -3 & 0 & \ldots & 0 \end{bmatrix} \text{Vec} \begin{bmatrix} g_{11} & g_{12} & g_{13} & g_{14} \\ g_{21} & g_{22} & g_{23} & g_{24} \\ g_{31} & g_{32} & g_{33} & g_{34} \\ g_{41} & g_{42} & g_{43} & g_{44} \end{bmatrix} = \begin{bmatrix} a \\ 1 \\ 1 \\ 0 \end{bmatrix}$$

Equation 6

A modified subspace identification algorithm is used to solve the constrained model identification problem in the following steps:

(a) Calculate a candidate state variable time series $\{X(t)\}$ from input and output test data $\{MV(t)\}$ and $\{CV(t)\}$;

(b) Find an optimal model order n according to AIC (Akaike Information Criterion) and obtain the optimal state variable estimate $\{X_n(t)\}$;

(c) Calculate an initial unconstrained system model in a state space format $M_0=\{A_0, B_0; C_0, D_0\}$;

(d) Impose gain constraints specified above by the user, and re-estimate matrix C or $\{B\ D\}$ by solving the constrained identification problem below:

$$\text{Min } J(\{MV(t), CV(t), X_n(t)\}, \theta)$$

Equation 7 subject to $$X_n(t+1) = AX_n(t) + BMV(t)$$

$$CV(t) = CX_n(t) + DMV(t)$$

$$G = C(I-A)^{-1}B + D$$

$$S_L \times \text{Vec}(G) = g_0$$

It is possible to make the problem a linear estimation in the above identification. This is achieved by re-estimating either B or C matrix. For an optimal solution, it is possible to iteratively re-estimate both B and C and calculate the squared prediction error to find a set of $\{A, B, C, D\}$ that generates the minimal $J(\cdot)$. The following example estimates only B matrix, similar formula may apply to estimation of C matrix.

Consider the gain matrix equation with unknown matrix B:

$$G = C(I-A)^{-1}\hat{B} + D$$

Equation 8

In order to apply gain matrix constraint (Equation 5), with the Kronecker product and the Vec(•) operator, re-write above (Equation 8) to get:

$$\text{Vec}(G) = \text{Vec}(C(I-A)^{-1}\hat{B} + D) =$$
$$(I \otimes [C(I-A)^{-1}])\text{Vec}(\hat{B}) + \text{Vec}(D) = M\text{Vec}(\hat{B}) + \text{Vec}(D)$$

Equation 9

Then, the re-written linear estimation problem is $$\min J(\{MV(t), CV(t), X_n(t)\}, \theta)$$

Equation 10 subject to:

$$X_n(t+1) = AX_n(t) + \hat{B}MV(t)$$

$$\text{Vec}(G) = M\text{Vec}(\hat{B}) + \text{Vec}(D)$$

$$S_L \times \text{Vec}(G) = g_0$$

For single iteration, a Constrained Least-Square (CLS) algorithm is used to solve Equation 10 and obtain a LS estimation of B matrix. For multiple iterations, it is possible to alternatively estimate C and B, subject to the specified gain constraints in a similar way, until a minimal J(•) is found.

Using the case structure information 205 and the model structure information 210 described above, the controller 110 can identify a model of the process 120 at step or module 215. Any model structure information 210 specified by the user is enforced in a consistent way.

The system 200 or controller 110 uses information about the model, including the RGA uncertainty, the gain uncertainty, and model curves from step/module 215 to create a master model. The master model, at step/module 220 can be "repaired," which herein refers to further forcing the results of the identification of the model to be consistent with engineering knowledge of the subject process 120. Repair 220 of the model utilizes the model structure information 210 as well as the model information from model identification 215. Engineering knowledge, as noted above, refers to correction of the model to ensure that the model is not calculating solutions for the process variables (i.e. MVs) that would push the subject process 120 in a weak direction. Repair 220 of the master model is described in more detail with respect to FIG. 3, below.

At step 225, the system 200 implements the repaired model curves into the MPC controller 110. The MPC controller 110 can then create a dynamic move plan for the subject process 120 based on the master model. The controller 110 moves are simulated, then implemented in, or otherwise deployed to the process 120 as illustrated at step or operation 230.

The controller 110 continues to monitor and control the subject process 120 by noting subsequent changes in the process 120. Data about the process 120 that indicates errors or bad data can be removed from future repairs of the model at step 235 (referred to as "automatic slicing" which is part of model identification and adaption as described in parent related U.S. patent application Ser. No. 13/890,818, herein incorporated by reference in its entirety). The steps or operations in FIG. 2 are repeated to assist the MPC controller 110 in finding a functional steady-state of the process 120.

Figure 3:
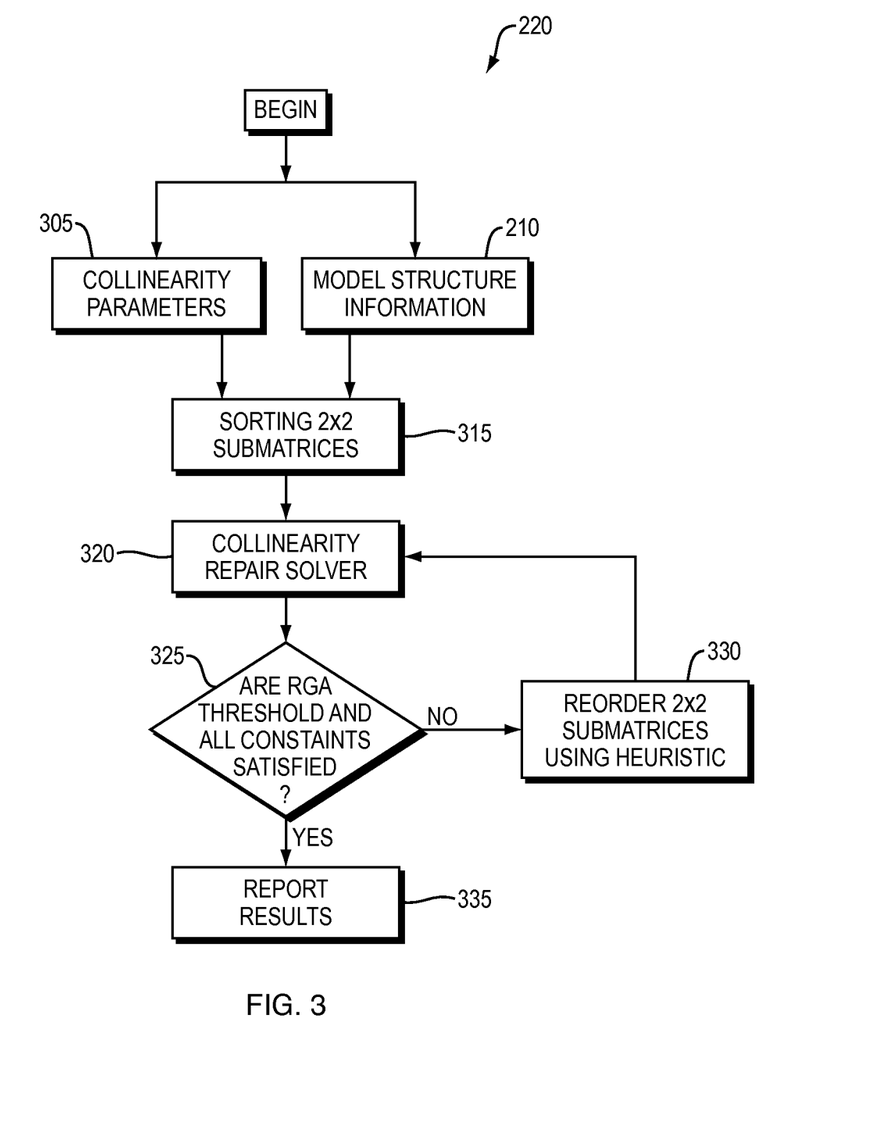
FIG. 3 is a detail flow diagram of the collinearity repair operation (module) of FIG. 2 according to the present invention.

FIG. 3 is a flow diagram describing an example of collinearity repair 220 or model adaptation mode of operation of MPC controller 110 according to the present invention. Collinear repair 220 ensures that small changes in the outputs (e.g., a composition in the overhead of a distillation column) does not require large changes in the inputs (e.g., the reflux rate). This can be done offline, as described with respect to FIG. 3, or online such as in U.S. Pat. No. 7,209,793; U.S. Application Publication No. 2011/0130850, now U.S. Pat. No. 8,560,092; and U.S. application Ser. No. 13/760,949, all incorporated herein by reference. Offline repair is preferable, but online repair may be used as needed. The relationships between the process variables (CVs), as noted above in Equation 1, can be organized into a square matrix which represents a master model of the process. Subsets of the master model can be created in the form of a plurality of 2×2 submatrices. Organization and alteration of these submatrices allow the controller 110 to repair the master model.

At step 305, collinearity parameters including the regular RGA threshold, the large RGA threshold and the small RGA threshold are obtained from the model structure information of step 215 in FIG. 2. If a 2×2 submodel with an initial RGA greater than the large RGA threshold, then final repaired RGA of that 2×2 submodel must be infinite. If a 2×2 submodel has an initial RGA less than the small regular RGA threshold, the final repaired RGA of that 2×2 submodel is not be infinite.

The default values are 2, 10, and 50 for the Small RGA Threshold, Regular RGA Threshold, and Large RGA Threshold. For example, if the original RGA is 0.5, then the final RGA must not be infinite, but can be any other value, although a value less than 10 is preferred. If the original RGA is 5, then the final RGA may be any value. An infinite value is allowed but is not preferred. A value greater than 10 is also not preferred. If the original RGA is 15, then an infinite RGA is preferred and secondarily a value less than 10. If the original RGA is 100, then only an infinite RGA value is allowed.

The identification of a dynamic model from a model predictive controller is usually not solved as a single optimization problem but as a series of optimization problems. Each optimization problem is referred to here as a Case. A Case consists of a subset of both input and output variables as well as various model parameters that are specified by the user to guide the optimization. An overview of where the Case fits into the model predictive controller 110 is provided at 205 in FIG. 2.

The coordinated identification requires a novel heuristic that forces the identification of multiple cases to be consistent. This algorithm does the following:

a. Takes any simple constraints defined at the master model level and passes them directly to the cases.

b. In the case of the gain ratio constraint, if all variables in the constraint are in a case, then this information is directly passed to a case. If all variables are not in the case, then simple gain constraints are constructed.

c. In the case of the material balance constraints, if all variables in the constraint are in a case, then this information is directly passed to a case. If all variables are not in the case, then material balance constraints are constructed for the cases with the missing constraint information fixed as appropriate.

The focus here is on the explicit steady state gain constraints that are specified by the user to guide the optimization. Each case may have several types of constraints as defined earlier in Equations 2-4.

There may be a large number of such constraints depending on the user specification. Once a base set of gains have been identified from the data and individual Cases, the gains are modified by solving the following coordinated quadratic programming problem:

$$\min \Sigma (g_{ij} - g_{0ij})^2 \qquad \text{Equation 11}$$

subject to $$\Sigma \alpha_{km} * g_{ij} = \beta_k \qquad \text{Equation 12}$$

where $g_{ij}$ is the gain of the $i^{th}$ input and $j^{th}$ output and is the optimization variable; $g_{0ij}$ is the initial constrained gain of the $i^{th}$ input and $j^{th}$ output and is the result of the identification; $\alpha_{km}$ is the $m^{th}$ multiplier of the $k^{th}$ constraint; and $\beta_k$ is the user specified value of the $k^{th}$ constraint.

Each of the constraint types may be put into the form specified above. The simple gain constraints and general gain constraints are trivially so. The gain ratio constraints are converted:

$$\frac{g_{ij}}{g_{kj}} = \beta_l \quad \text{Equation 13}$$

which becomes $$g_{ij} - \beta_l \times g_{kj} = 0$$

In the case of competing constraints, a lexicographic ordering of the constraints is established by introducing ranks and slack variables.

The above optimization problem is performed in transformed space where:

$$g_{ij} = g_{true,ij} \times T_i$$

where $g_{ij}$ is the transformed gain for input i and output j; $g_{true,ij}$ is the actual optimization variable of the gain for input i and output j; $T_i$ is the user specified typical move for input i.

In addition to the above constraints, a further constraint is added to improve the predictive performance:

$$\Sigma g_{ij} = \Sigma g_{0,ij}$$

where the sum occurs over the input i and there is a separate constraint for each output j.

This is a low rank constraint (low priority) to ensure that the sum of the gain over all inputs (i) for each output (j) is equal to the sum of the initial constrained gains.

Each case will then generate a subset of the dynamic models that will be assembled into a single model for use in the model predictive controller 110. This single model is referred to as the "master model." Constraints can be placed on the master model as well. During the identification, these constraints are passed to the cases to assist in the identification. They are passed in a specific way:

Passing of Simple Gain Constraints from master model to sub-cases refers to instances when any simple gain constraints in the Master model are passed to the cases without modification.

Passing of Gain Ratio Constraints from master model to sub-cases refers to instances when, if all of the variables in the gain ratio constraint in the master model constraint are in the cases, then the constraint is passed without modification. If there are variables in the master model constraint that are not in the cases, then the constraints are converted from a gain ratio constraint to a simple gain constraint.

For example, consider the following ratio constraint:

$$\frac{g_{12}}{g_{13}} = 7$$

If output 3 is not in the case, then this constraint is converted to the following:

$$g_{12} = 7 \times g_{master,13}$$

where $g_{master\ 13}$ is the gain for the relationship from input 1 to output 3 in the master model. Since the right hand side is a constant, this becomes a simple gain constraint.

Passing of General Gain Constraints from the master model to the cases refers to the condition where all of the variables in the gain ratio constraint in the master model are in the cases, then the constraint is passed without modification. If there are variables in the master model constraint that are not in the case, then the right hand side or the constraint equation must be modified. For example, consider the following general gain constraint:

$$7g_{12} + 4g_{45} + 6g_{13} = 5$$

If output 3 is not in the case, this constraint is modified to the following:

$$7g_{12} 4g_{45} = 5 - g_{master,13}$$

In the above example, the gain from the master model is used in the case, but if there are multiple cases, the cases are identified in a user-specified order, and the gain used is the gain identified from the previous case (preceding case in the user-specified ordering).

Referring back to FIG. 3, the model structure information 210 and the collinearity parameters 305 are used at step 315 to sort the plurality of 2×2 submatrices into a list that is ordered from the submatrices that have the most common pairing with other 2×2 submatrices. This ordering is referred to as the optimum order, and the submatrices are repaired according to this order.

Next, using the order of 2×2 submatrices provided by the preceding step, the collinearity repair solver 320 provides a solution for the submatrices by seeking to maximize RGA given the current order of the submatrices. The user may also manually input an order of the submatrices if the user wishes to apply engineering experience instead of allowing the processor at step 315 to determine the optimal order of the submatrices.

At step 325, the controller 110 checks to determine whether the RGA threshold identified 210 is satisfied, and if all constraints from the model structure information at step 310 are satisfied. If they are not, the controller 110 utilizes a heuristic process 330. The heuristic process 330 first takes any simple constraints defined at the master model level and passes them directly to the 2×2 submatrices. Then, with respect to the gain ratio constraint, if all variables in the constraint are in a case, this information is passed directly to the case. If all variables are not in the case, then material balance constraints are constructed for the cases with missing constraint information and are fixed as appropriate.

The 320-325-330 loop is repeated until the RGA threshold and all constraints are satisfied. Then, at step 335, the MPC controller 110 (in model adaptation mode 220) reports results to the user.

Figure 4:
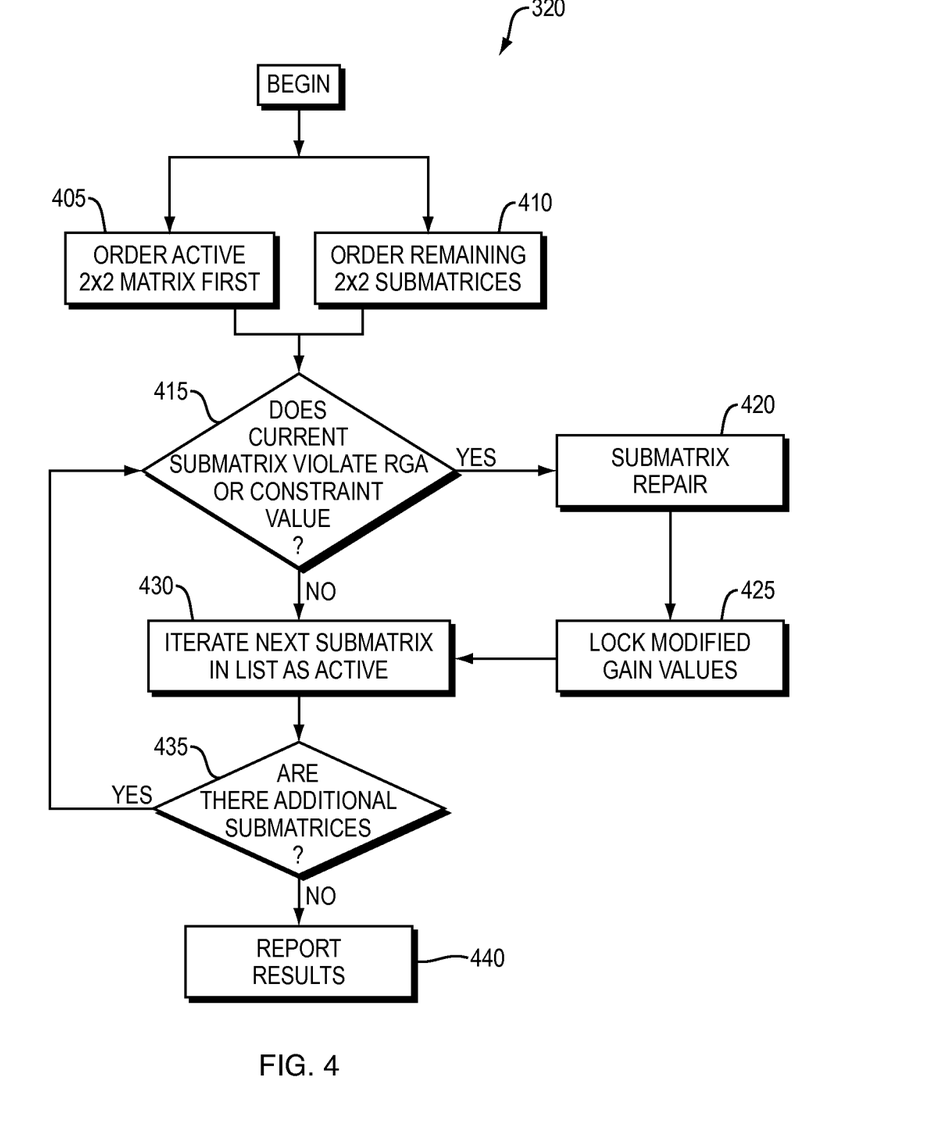
FIG. 4 is a further flow diagram detailing the collinearity repair solver by the collinearity repair module of FIG. 3.

FIG. 4 is a block flow diagram further detailing the steps of the collinearity repair solver 320 of FIG. 3. It is possible, after the model gain matrix is assembled, that a large number of 2×2 submodels will exhibit near collinearity. Therefore, solver 320 will seek to remove collinearity of all 2×2 submodels and enforce the user specified constraints. To achieve these two goals, solver 320 uses the following heuristic algorithm:

Step 1, list all of the 2×2 submodels and constraints in a List, called ListQ with elements $Q_i$. $Q_i$ is either a 2×2 submodel or a constraint. $Q_i$ is composed of a number of steady state gains.

Step 2, order the ListQ by summing how many other elements of ListQ each element of $Q_i$ participates. For example, a 2×2 submodel can be written as the 2×2 matrix:

$$2 \times 2 \text{ Submodel} = \begin{bmatrix} G_{11} & G_{12} \\ G_{21} & G_{22} \end{bmatrix}$$

where NSubs($G_{11}$) is the number of other $Q_i$ submodels that $Q_i$ participates in. The submodel index for the 2×2 submodel can then be calculated as:

Submodel Index for $Q_i$=NSubs($G_{11}$)+NSubs($G_{21}$)+ NSubs($G_{12}$)+NSubs($G_{22}$)

Ordering $Q_i$ by the Submodel Index is then possible.

Step 3, solve the submodels in order. If it is a 2×2 submodel, fix the collinearity and then mark each element of the 2×2 submodels as unchangeable.

The algorithm for repairing a 2×2 submodel depends on the number of changeable elements: (1) if the RGA (see below) is below a user-specified threshold, then continue to the next submodel; (2) if no elements are changeable, continue to the next submodel; (3) if one element is changeable, change that single element; (4) if two or more elements are changeable, change either the largest relative gain or the gain that is in the upper left of the matrix.

The algorithm for repairing a constraint is the same. Normally a repair of a 2×2 submodel means forcing the system to be exactly collinear. However, the user may override that choice and choose an optimal RGA value for the system. The RGA value is defined as:

$$RGA = \frac{G_{11} * G_{22}}{(G_{11} * G_{22} - G_{12} * G_{21})}$$

Step 4, once all of the submodels have been repaired, calculate an objective function which is the sum of the square of the violations of the RGA expectation for each 2×2 submodels. For example, if the user has specified a maximum allowed RGA of 10.0, then the objective function for that submodel is:

$$J(RGA) = \begin{cases} (RGA - 10)^2 & \text{if } (RGA > 10) \\ 0 & \text{if } (RGA \leq 10) \end{cases}$$

It is possible that the fourth step will result in additional 2×2 submodels violating the RGA specification. The contribution of these submodels is added to the objective function list.

If the objective function is 0 or has not changed in a user-specified number of iterations, and the algorithm is finished.

Step 5, use a k-opt heuristic to reorder the submodels and return to Step 3. A 2-opt is normally done which results in a simple switch of two elements of ListQ.

Accordingly, in FIG. 4, at step 405, an "active" 2×2 submodel selected either by the controller 110 or by the user is identified to be repaired first. At step 410, the remaining 2×2 submodel order is provided to the controller 110/solver 320. At step 415, the controller 110/solver 320 determines whether the current submodel violates RGA threshold or a constraint. If it does, then the controller 110/solver 320 moves to step 420 where, depending on whether the RGA threshold or the constraint is violated, the submodel is altered. If the RGA threshold is violated, the controller sets the upper left gain of the submodel so that the RGA is equal to infinity. If the upper left gain is locked, the next gain is set, and if all gains are locked, then the solver process 320 continues. If a constraint or material balance is violated, the controller 110/solver 320 changes the largest gain so that the balance is satisfied. If the largest gain is locked, the next largest gain is changed. If all are locked, then the process 320 continues.

At step 425, any gain that was modified is locked so that it cannot be changed in future repairs. This prevents the steps of solver 320 from continuing indefinitely.

At step 430, the solver 320 moves on to the next matrix in the list, and designates the next matrix to be solved as "active." At step 435, the solver 320 examines whether all submodels have been solved. If not, the solver 320 repeats by returning to step 415, and the 415-420-425-430-435 loop is continued until the solver 320 reaches the end of the list of submodels.

At step 440, when the solver 320 reaches the end of the list, the solver 320 reports the results.

By way of example of the processes described above, consider a simple example of a distillation column with a single feed rate. Some product exits the top of the column and some product exits the bottom. A material balance constraint can be added where the sum of the exit flow must match the feed rate. When performing the collinearity repair or the identification of other variables in the column, the constraint is held constant in subsequent calculations.

It is possible that the case identification will result in a sub-matrix of gains that has an RGA with a sign directionality that is different from the expected value. The expected value is based on the engineering judgment of the engineer. Consider the following 2×2 submodel that is the result of the identification:

$$\text{Submodel from identification} = \begin{bmatrix} G_{11} & G_{12} \\ G_{21} & G_{22} \end{bmatrix}$$

where the current master model has the form:

$$\text{Submodel from master model} = \begin{bmatrix} GM_{11} & GM_{12} \\ GM_{21} & GM_{22} \end{bmatrix}$$

The gain ratios from the master model are:

$$\text{Ratio}_1 = \frac{GM_{11}}{GM_{21}}$$

$$\text{Ratio}_2 = \frac{GM_{12}}{GM_{22}}$$

The following gain ratio constraints are then added:

$$\text{Ratio}_1 = \frac{G_{11}}{G_{21}}$$

$$\text{Ratio}_2 = \frac{G_{12}}{G_{22}}$$

This will ensure that the magnitude and direction of the RGA of the submodel are transferred from the master model to the subcase.

When it is desirable that the submodel be made exactly collinear, then add a further constraint that $\text{Ratio}_1 = \text{Ratio}_2$, choosing the average of the two ratios.

The definition of RGA is:

$$RGA = \frac{G_{11} * G_{22}}{(G_{11} * G_{22} - G_{12} * G_{21})}$$

which can be re-written as $$RGA = \frac{\text{Ratio}_1}{(\text{Ratio}_1 - \text{Ratio}_2)}$$

If $\text{Ratio}_1$ is greater than 0 and a positive RGA is desired, the following constraints are added:

$$\text{Ratio}_1 > \text{Ratio}_2$$

$$\text{Ratio}_1 - (\text{Ratio}_1 - \text{Ratio}_2) * \text{RGAMAX} < 0$$

where RGAMAX is a user-specified limit. Similar constraints can be added if $\text{Ratio}_1 < 0$ as well as constraints if a negative RGA is desired. These constraints can be ranked and added to the quadratic programming problem described above.

Figure 5:
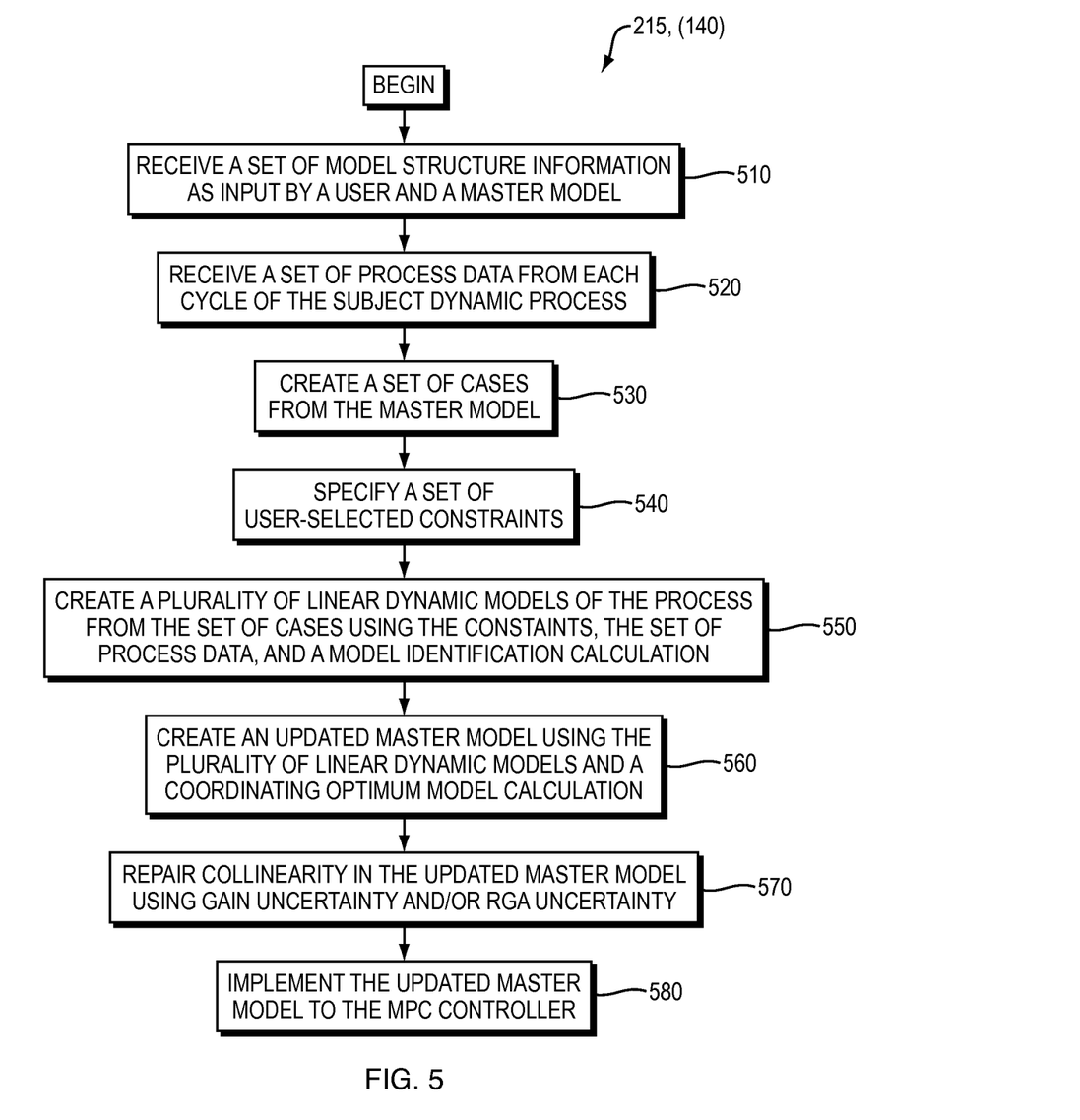
FIG. 5 is a block flow diagram of model identification and update in the MPC controller of FIGS. 1 and 2 according to the present invention.

FIG. 5 is a block-flow diagram of model identification and update (for example at 215 in FIG. 2 and/or at 140 in FIG. 1) of the present invention. At step 510 the MPC controller 110 receives model structure information 210 and the master model. The set of model structure information 210 comprising a plurality of constraints representative of engineering judgment 160.

At step 520, the MPC controller 110 receives a set of process data from each cycle of the subject dynamic process.

At step 530, a set of cases are created from the master model, the user specifies the set of cases from the master model that he or she wishes to focus on. The case structure information 205 includes information such as the process variables as well as the time to steady-state, identification parameters, transform information, variable filtering. Each case is a portion of the master model. The cases can be repaired according to the algorithms described in FIGS. 3 and 4.

At step 540 the user specifies constraints from the model structure information 210 and the master model.

At step 550 a plurality of linear dynamic models of the process are created from the set of cases using the user-specified constraints, the set of process data, and the model structure information 210. The user can manually promote curves from the identified cases into the master model, if desired.

At step 560 an updated master model is created using the plurality of linear dynamic models and a coordinating optimum model algorithm (calculation), described above. The system 200 can run a simulation using the current process values, if desired.

At step 570 collinearity is repaired in the updated master model if necessary using gain uncertainty and/or RGA uncertainty.

At step 580 the updated master model is implemented (deployed) to the MPC controller 110 wherein implementation (or deployment) preserves the plurality of constraints representative of engineering judgment 160.

Figure 6:
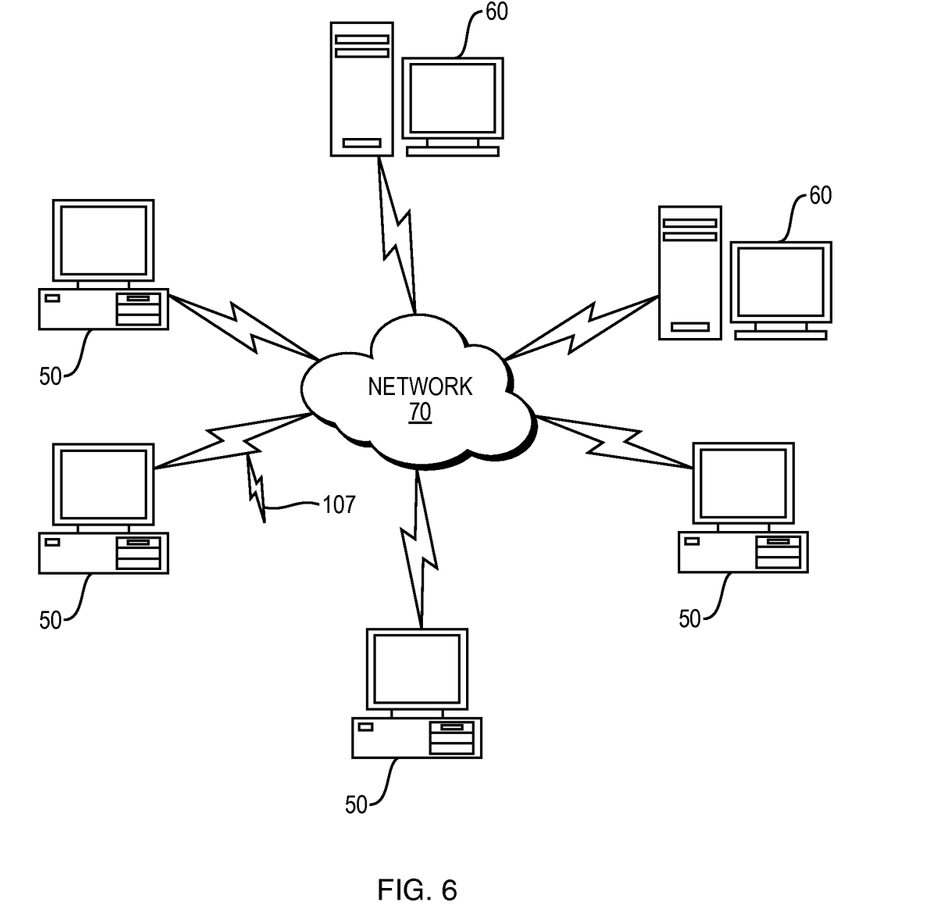
FIG. 6 illustrates a computer network or similar digital processing environment in which the present invention may be implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
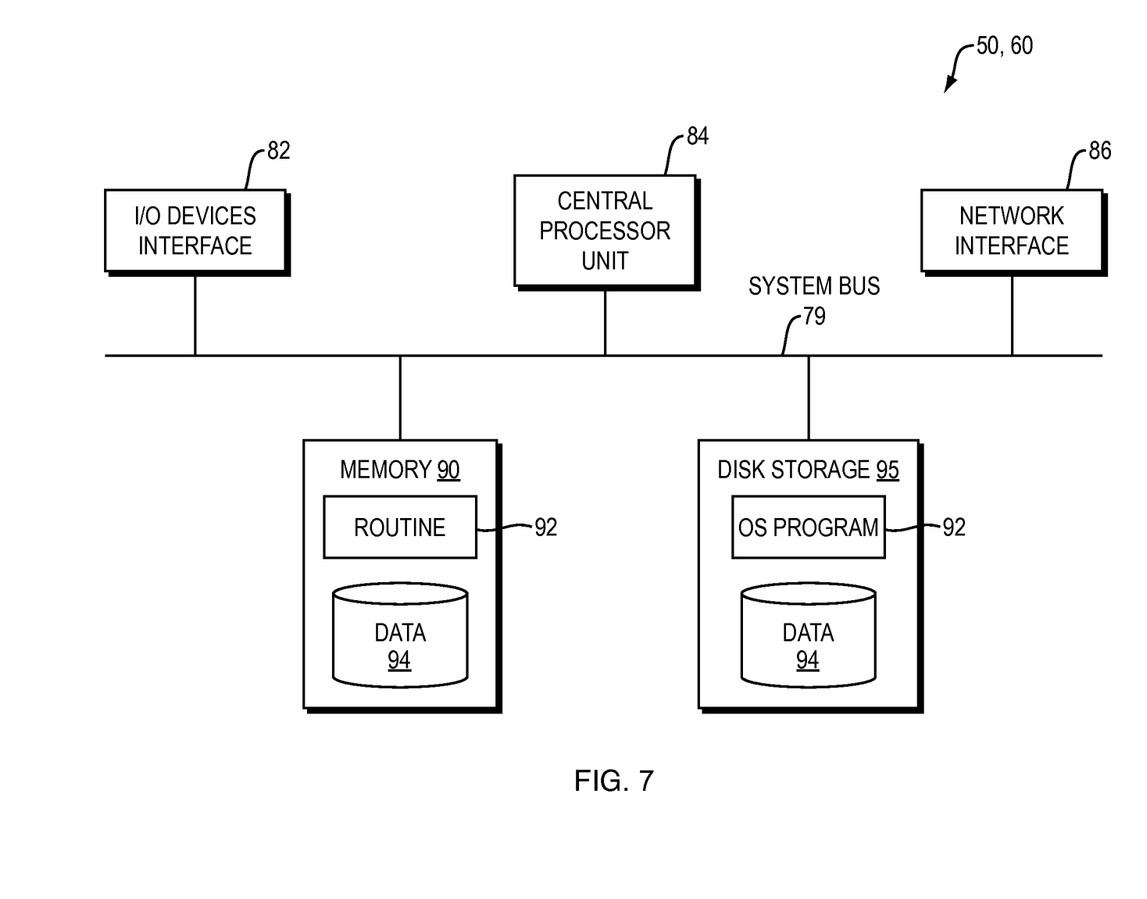
FIG. 7 is a diagram of the internal structure of a computer (e.g., client processor/device 50 or server computers 60) in the computer system of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., MPC controller 110 operations 220, collinearity repair and solver 320, constrained Identification, coordinated Identification, model identification and update 215, 140 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A computer implemented method of model predictive control (MPC) of a subject dynamic process by a MPC controller, the MPC controller representing the subject dynamic process by a master model, the method comprising:
   receiving a set of model structure information as input by a user, the set of model structure information comprising a plurality of constraints representative of engineering judgment;
   receiving a set of process data from each cycle of the subject dynamic process;
   creating a set of cases from the master model, the cases comprising information about the subject dynamic process, and each case being a portion of the master model;
   specifying a set of user-selected constraints from the model structure information and the master model;
   from one or more cases of the set of cases, creating a plurality of linear dynamic models of the subject dynamic process using the set of user-selected constraints, the set of process data, and a model identification calculation;
   creating an updated master model using the plurality of linear dynamic models and a coordinating optimum model calculation;
   repairing collinearity in the updated master model using at least one of: gain uncertainty or RGA uncertainty, the repairing comprises steps of:
      (i) converting a set of user-defined RGA constraints into gain ratio constraints,
      (ii) solving a set of submodels of the updated master model, wherein each of the submodels includes gain ratio constraints, the solving modifying the set of submodels to satisfy the converted set of user-defined RGA constraints, and
      (iii) calculating an objective function over the set of submodels, and repeating the steps (i)-(iii) until the calculated objective function indicates RGA violations or general gain constraint violations are repaired in the updated master model; and
   implementing the updated master model to the MPC controller, wherein implementing the updated master model preserves the plurality of constraints representative of engineering judgment.

2. The method of claim 1, wherein the plurality of constraints comprises at least one of: simple steady state gain constraints; steady state gain ratio constraints; material balance constraints; gain uncertainty; RGA uncertainty; or locked gains.

3. The method of claim 1, wherein the model identification calculation, for each of the one or more cases, is a subspace identification algorithm that finds a solution satisfying the plurality of constraints and that calculates an optimal model using the set of user-selected constraints and the set of process data.

4. The method of claim 3, wherein the subspace identification algorithm comprises the steps of:
   transferring at least one gain constraint into a constrained vector estimation problem;
   identifying an unconstrained state space model;
   identifying an optimal model order to obtain an optimal state variable estimate; and
   calculating a solution to the constrained vector estimation problem using the unconstrained state space model.

5. The method of claim 1, wherein the coordinating optimum model calculation finds a solution to a coordinated identification calculation that satisfies the plurality of constraints and calculates an optimum master model.

6. The method of claim 5, wherein the coordinated identification calculation comprises the steps of:
   passing at least one simple gain constraint from the master model to at least one case from the set of cases;
   passing at least one gain ratio constraint from the master model to at least one case from the set of cases, converting the at least one gain ratio constraint to simple gain constraints if variables in the at least one gain ratio constraint are unavailable in the at least one case;
   passing at least one general gain constraint from the master model to at least one case from the set of cases, converting the at least one general gain constraint to simple gain constraints if variables in the at least one general gain constraint are unavailable in the at least one case;
   identifying a set of subcase models using a constrained identification calculation and the set of process data; and
   updating the master model by assembling the set of subcase models.

7. The method of claim 1, wherein the updated master model undergoes collinearity repair due to at least one RGA violation or general gain constraint violation existing within the master model.

8. The method of claim 7, wherein the steps of repairing collinearity further comprise:
   identifying the set of submodels from the updated master model;
   sorting the set of submodels into a list;
   solving the set of submodels in order as defined by the list;
   calculating the objective function over the set of submodels; and
   reordering the set of submodels and repeating the steps until the calculated objective function indicates a defined threshold of RGA violations and general gain constraint violations are repaired in the updated master model.

9. The method of claim 8, wherein each of the set of submodels is represented by a 2×2 matrix.

10. The method of claim 8, wherein solving the set of submodels further comprises:
    transferring gain ratio constraints from the updated master model to the set of submodels; and
    solving the set of submodels with the transferred gain ratio constraints so that each of the submodels satisfies the converted set of user-defined RGA constraints.

11. The method of claim 1, wherein implementing the updated master model to the MPC controller ensures that the updated master model accurately predicts towards a steady state gain matrix and ensures accuracy of corresponding inverse gain matrix.

12. The method as claimed in claim 1, wherein the method provides off-line and on-line model identification of the master model.

13. The method as claimed in claim 1, wherein the master model is a multiple-input-multiple-output (MIMO) dynamic model.

14. An apparatus for model predictive control (MPC) of a subject dynamic process by a MPC controller, the MPC controller representing the subject dynamic process by a master model, the apparatus comprising:
   a computer means coupled to the MPC controller and executed by a processor, the computer means:
   receiving a set of model structure information as input by a user, the set of model structure information comprising a plurality of constraints representative of engineering judgment;
   receiving a set of process data from each cycle of the subject dynamic process;
   creating a set of cases from the master model, the cases comprising information about the subject dynamic process, and each case being a portion of the master model;
   specifying a set of user-selected constraints from the model structure information and the master model;
   from one or more cases of the set of cases, creating a plurality of linear dynamic models of the subject dynamic process using the set of user-selected constraints, the set of process data, and a model identification calculation;
   creating an updated master model using the plurality of linear dynamic models and a coordinating optimum model calculation;
   repairing collinearity in the updated master model using at least one of: gain uncertainty or RGA uncertainty, the repairing comprises steps of:
      (i) converting a set of user-defined RGA constraints into gain ratio constraints,
      (ii) solving a set of submodels of the updated master model, wherein each of the submodels includes gain ratio constraints, the solving modifying the set of submodels to satisfy the converted set of user-defined RGA constraints, and
      (iii) calculating an objective function over the set of submodels, and repeating the steps (i)-(iii) until the calculated objective function indicates RGA violations or general gain constraint violations are repaired in the updated master model; and
   implementing the updated master model to the MPC controller, wherein implementing the updated master model preserves the plurality of constraints representative of engineering judgment.

15. The apparatus of claim 14, wherein the plurality of constraints comprises at least one of: simple steady state gain constraints; steady state gain ratio constraints; material balance constraints; gain uncertainty; RGA uncertainty; or locked gains.

16. The apparatus of claim 14, wherein the model identification calculation for each of the one or more cases is a subspace identification algorithm that finds a solution satisfying the plurality of constraints and that calculates an optimal model using the set of user-selected constraints and the set of process data.

17. The apparatus of claim 16, wherein the subspace identification algorithm comprises:
   transferring at least one gain constraint into a constrained vector estimation problem;
   identifying an unconstrained state space model;
   identifying an optimal model order to obtain an optimal state variable estimate; and
   calculating a solution to the constrained vector estimation problem using the unconstrained state space model.

18. The apparatus of claim 14, wherein the coordinating optimum model calculation finds a solution to a coordinated identification calculation that satisfies the plurality of constraints and calculates an optimum master model.

19. The apparatus of claim 18, wherein the coordinated identification calculation includes:
   passing at least one simple gain constraint from the master model to at least one case from the set of cases;
   passing at least one gain ratio constraint from the master model to at least one case from the set of cases, converting the at least one gain ratio constraint to simple gain constraints if variables in the at least one gain ratio constraint are unavailable in the at least one case;
   passing at least one general gain constraint from the master model to at least one case from the set of cases, converting the at least one general gain constraint to simple gain constraints if variables in the at least one general gain constraint are unavailable in the at least one case;
   identifying a set of subcase models using a constrained identification calculation and the set of process data; and
   updating the master model by assembling the set of subcase models.

20. The apparatus of claim 14, wherein the updated master model undergoes collinearity repair due to at least one RGA violation or general gain constraint violation existing within the master model.

21. The apparatus of claim 20, wherein the steps of repairing collinearity further comprise:
   identifying the set of submodels from the updated master model;
   sorting the set of submodels into a list;
   solving the set of submodels in order as defined by the list;
   calculating the objective function over the set of submodels; and
   reordering the set of submodels and repeating the steps until the calculated objective function indicates a defined threshold of RGA violations and general gain constraint violations are repaired in the updated master model.

22. The apparatus of claim 21, wherein each of the set of submodels is represented by a 2×2 matrix.

23. The apparatus of claim 21, wherein solving the set of submodels further comprises:
   transferring gain ratio constraints from the updated master model to the set of submodels; and
   solving the set of submodels with the transferred gain ratio constraints so that each of the submodels satisfies the converted set of user-defined RGA constraints.

24. The apparatus of claim 14, wherein implementing the updated master model to the MPC controller ensures that the updated master model accurately predicts towards a steady state gain matrix and ensures accuracy of corresponding inverse gain matrix.

25. The apparatus as claimed in claim 14, wherein the computer means provides to the MPC controller off-line and on-line model identification of the master model.

26. The apparatus as claimed in claim 14, wherein the master model is a multiple-input-multiple-output (MIMO) dynamic model.

\* \* \* \* \*